US005410903A

United States Patent [19]

Schneider

[11] Patent Number: 5,410,903
[45] Date of Patent: May 2, 1995

[54] CLAMP GUN CRIMP HEAD

[75] Inventor: Dean J. Schneider, Highland, Mich.

[73] Assignee: GKN Automotive, Inc., Auburn Hills, Mich.

[21] Appl. No.: 179,515

[22] Filed: Jan. 10, 1994

[51] Int. Cl.[6] .................. B21D 39/04; B23P 11/00
[52] U.S. Cl. .................. 72/399; 72/407; 72/452; 29/243.56
[58] Field of Search .................. 72/399, 402, 403, 407, 72/453.16, 453.15, 452; 29/243.56

[56] References Cited

U.S. PATENT DOCUMENTS

| | | | |
|---|---|---|---|
| 2,647,814 | 8/1953 | Chilton | 72/399 |
| 2,766,631 | 10/1956 | Van Sittert | 72/453.16 |
| 3,154,981 | 11/1964 | McDurmont . | |
| 3,257,874 | 6/1966 | Madeira | 81/309 |
| 3,263,535 | 8/1966 | Zurcher | 81/308 |
| 3,402,436 | 9/1968 | Oetiker . | |
| 3,559,448 | 2/1971 | Illingworth et al. | 72/410 |
| 3,628,230 | 12/1971 | Grise | 29/243.56 |
| 3,810,495 | 5/1974 | Pack | 29/243.56 |
| 4,667,502 | 5/1987 | Bush et al. | 72/410 |
| 4,723,434 | 2/1988 | Bush | 72/410 |
| 4,884,432 | 12/1989 | Watson | 72/410 |
| 5,020,355 | 6/1991 | Payne | 29/243.56 |
| 5,195,353 | 3/1993 | Erbrick et al. | 72/410 |

FOREIGN PATENT DOCUMENTS

| | | | |
|---|---|---|---|
| 1369054 | 6/1964 | France | 29/243.56 |

*Primary Examiner*—Daniel C. Crane
*Attorney, Agent, or Firm*—Harness, Dickey & Pierce

[57] ABSTRACT

A crimp head for crimping a clamp has a pair of jaws for plastically deforming the clamp in a first direction and a plunger for plastically deforming the clamp in a second direction. The plastic deformation in the first direction reduces the circumference of the clamp while the plastic deformation in the second direction reduces the radial projection of the clamp.

12 Claims, 2 Drawing Sheets

CLAMP GUN CRIMP HEAD

FIELD OF THE INVENTION

The present invention relates to a crimping head for use in clamping a band or ring-type clamp. More particularly, the present invention relates to a crimping head for clamping the omega section of a band clamp while simultaneously preventing bulging of the omega section and minimizing the radial projection of the clamped omega section.

BACKGROUND OF THE INVENTION

Band clamps having an Omega section for crimping and thus tightening of the band clamp are well known in the prior art and are used throughout industry for hose clamps, boot clamps and the like. These omega style clamps are endless rings which are provided with an omega section or ear. This omega section or ear is comprised of an approximately rectangular bent out portion of the band. The omega styled clamp having such an omega section or ear is slipped over a hose installed on a nipple or a boot which has been installed on a housing. The diameter of the band clamp is designed such that it fits snugly around the assembled component. The omega section or ear is then plastically deformed to an approximately omega shape by means of a clamping tool having pincers which are applied to the band clamp in the comers of the transition from the ring shape to the omega section or ear shape. As a result thereof, the band clamp is tightened around the hose or boot by the shortening of the circumference of the band clamp. This operation is extremely simple, especially when compared with the screw-type hose clamps also used in the prior art.

While this operation is extremely simple to perform, problems have developed in achieving an acceptable and repeatable configuration for the crimped omega section. Certain applications are sensitive to the overall diameter of the hose or boot once it has been assembled including the diameter of the band clamp. This is especially true for automotive applications where the band clamp secures a boot to a constant velocity universal joint. The constant velocity universal joint normally rotates at wheel speed and thus any radial projection of the band clamp is susceptible to interference with other components of the vehicle or from road debris. Thus, it is essential that the radial projection of the crimped omega section of the band clamp be kept to a minimum.

Various prior art clamps have been developed which incorporate features that reinforce the omega section or ears of the band clamp. These features include pressed-out portions of the omega section of the clamp in the form of indentations, notches, grooves or the like. These reinforcing features attempt to assure the correct shape of the fold during contraction thereof in order to maintain a minimum radial projection of the crimped section. While these band clamps having the reinforcement features are capable of keeping a reduced radial projection of the omega section, they are not capable of minimizing the radial projection.

Another method to reduce the radial projection of the omega section has been to develop band clamp deforming or crimping pliers which incorporate a backup plate or anvil of some form. This backup plate or anvil has been stationary or it has been cammed inwardly toward the axial center of the band clamp to limit the radial movement of the omega section or ear such that the crimped ear forms an omega shape. While these crimping tools are also able to keep a reduced radial projection of the omega section, they are not capable, even with their camming action, of minimizing the radial projection of the omega section. These prior art pincers with back-up plates simply limit the outward movement of the omega section in order to maintain its omega shape.

Accordingly, what is needed is a crimping tool which has the ability to not only reduce the radial projection on the omega style band clamp, but also is capable of deforming the crimped omega section radially inward to minimize the radial projection of the assembled clamp.

SUMMARY OF THE INVENTION

The present invention provides the art with a crimping head which restricts the height of the omega section of a band clamp during the crimping operation and then as a secondary operation axially deforms the crimped omega section to minimize the radial projection of the omega styled band clamp. The clamping head comprises an anvil which acts to restrict the radial movement of the uncrimped omega section. As load is applied to the anvil, it pushes inward towards the omega styled band clamp and against a plunger. The plunger cams a pair of pincers inward while the anvil limits the radial movement of the omega section of the clamp. Once the omega section has been plastically deformed in a generally tangential direction, the anvil continues its downward motion to further deform the crimped omega section in the radial direction to minimize its radial projection.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
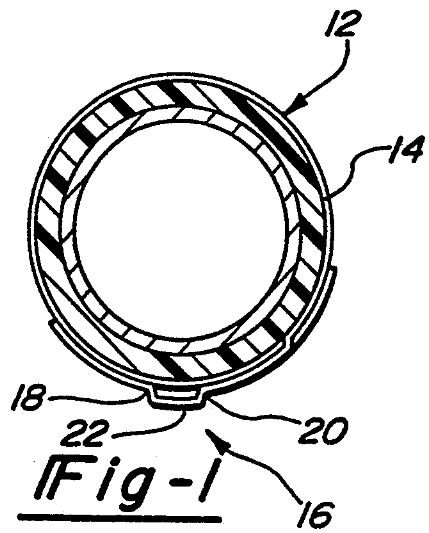
FIG. 1 is a side elevational view of an omega styled band clamp prior to being crimped.

Referring now to the drawings in which like reference numerals designate like or corresponding parts throughout the several views, there is shown in FIGS. 2 through 5 a clamp gun crimp head in accordance with the present invention which is designated generally by the reference numeral 10. Crimp head 10 is adapted to crimp an Omega or ear styled clamp 12 which is shown in FIG. 1. Clamp 12 includes a continuous band 14 which has a bent out ear or hat section 16. Hat section 16 includes a pair of legs 18 and 20 which extend generally perpendicular to band 14. A center portion 22 spans the distance between and attaches to legs 18 and 20. When it is desired to tighten clamp 12, a crimping or pincing tool is utilized which plastically deforms hat section 16 by forcing legs 18 and 20 towards one another to reduce the circumference of clamp 12. Crimp head 10 is a unique crimping or pincing tool which is able to plastically deform hat section 16 while at the same time minimizing the radial height of the plastically deformed hat section 16 as will be described later herein.

Figure 2:
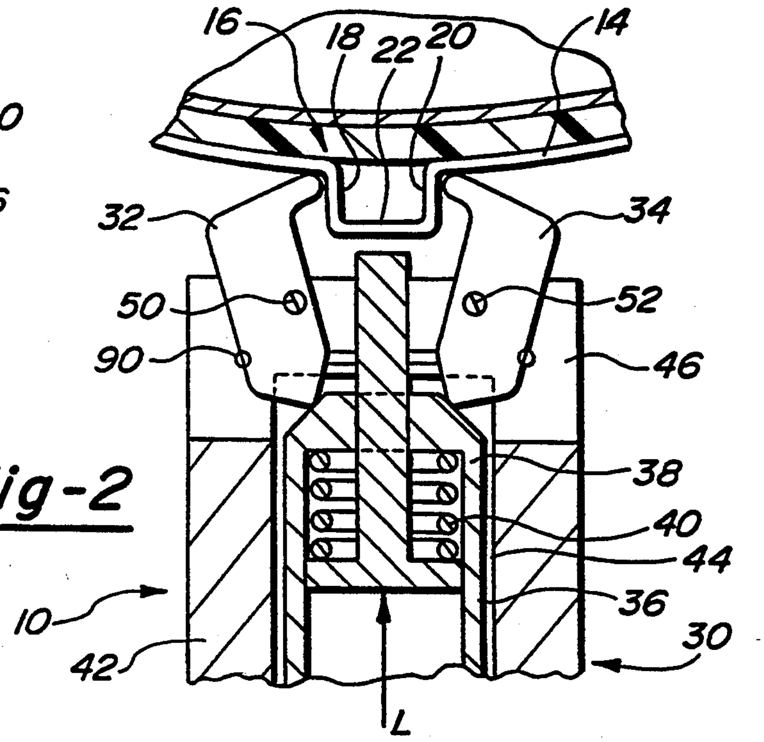
FIG. 2 is a side elevational view partially in cross section of a crimping head according to the present invention positioned with respect to the band clamp shown in FIG. 1 for plastically deforming the ears of the band clamp.
Figure 3:
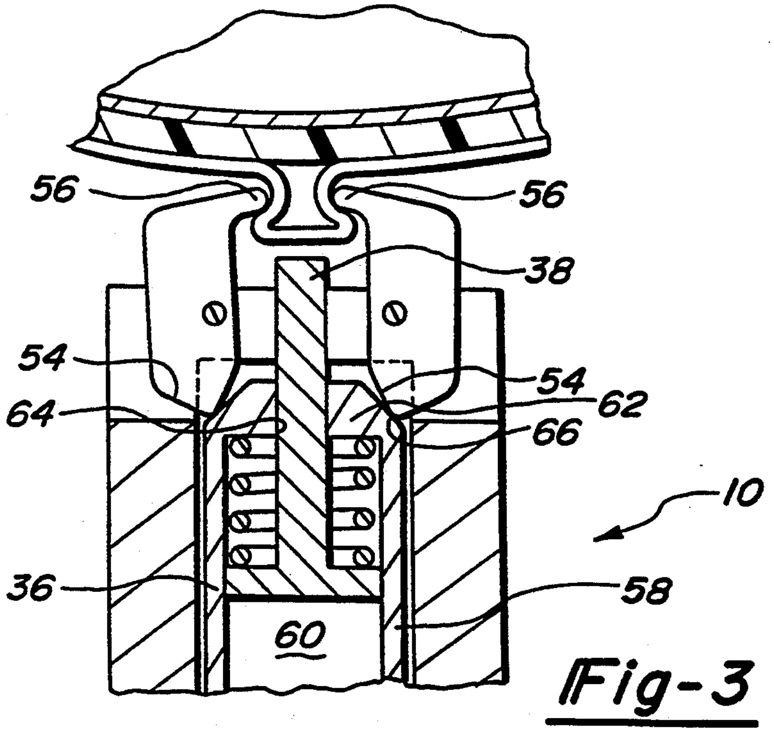
FIG. 3 is a side elevational view partially in cross section of a crimping head according to the present invention positioned with respect to the band clamp shown in FIG. 1 after the omega section has begun to be plastically deformed.
Figure 4:
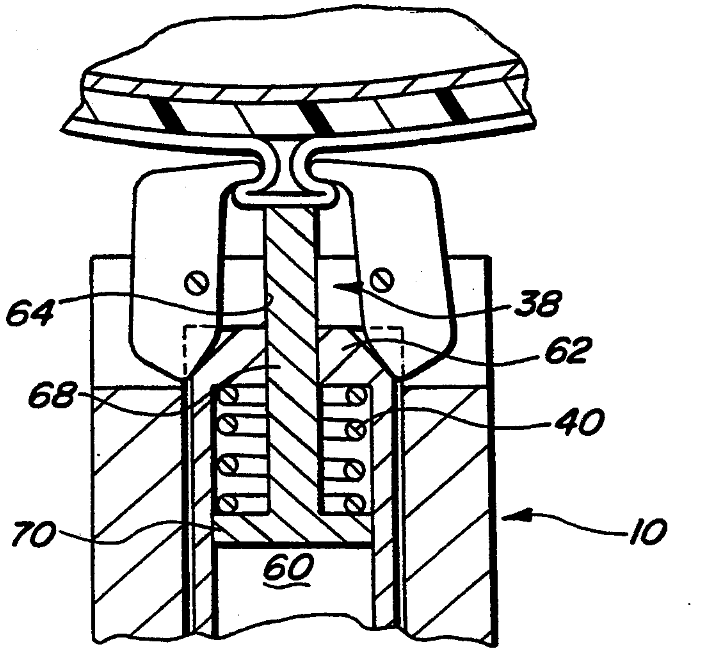
FIG. 4 is a side elevational view partially in cross section of a crimping head according to the present invention positioned with respect to the band clamp shown in FIG. 1 after the omega section has been plastically deformed.

Crimp head 10 comprises a housing 30, a pair of jaws 32 and 34, an external plunger 36, an internal plunger 38 and a biasing spring 40. Housing 30 includes a generally cylindrical body 42 having an internal cylindrical cavity 44. A generally rectangular slot 46 is located at one end of cylindrical body 42 and extends diametrically across cylindrical body 42. Rotatably mounted to housing 30 by a pair of pins 50 and 52 are jaws 32 and 34 respectively. Jaws 32 and 34 rotate from an open position as shown in FIG. 2 to a closed position as shown in FIG. 4 in order to plastically deform hat section 16 of clamp 12.

Each jaw of the pair of jaws 32 and 34 are a box shaped member which define a driven cam surface 54 at one end and a wedge shaped crimping edge 56 at the opposite end. Jaws 32 and 34 are mounted to housing 30 such that when a vertical load L, as shown in FIG. 2, is applied to internal plunger 38 and thus to driven cam surfaces 54, jaws 32 and 34 are moved from their open position as shown in FIG. 2 to their closed position as shown in FIG. 4. This movement from the open position to the closed position is operable to deform hat section 16 of clamp 12.

Disposed within cylindrical cavity 44 is external plunger 36. External plunger 36 is a cup shaped member having an external wall 58 which defines an internal cylindrical bore 60 which is open at one end. The opposite end of bore 58 is closed by an end wall 62. End wall 62 defines an aperture 64 which extends completely through end wall 62 to accommodate internal plunger 38 as will be described later herein. The exterior surface of end wall 62 defines an angular driving cam surface 66 which is in contact with driven cam surfaces 54 of jaws 32 and 34. External plunger 36 moves longitudinally within cavity 44 from a lower position as shown in FIG. 2 to an upper position as shown in FIG. 4. When moving from the lower position to the upper position, driving cam surface 66 engages driven cam surfaces 54 of jaws 32 and 34 to move jaws 32 and 34 from their open position to their closed condition to plastically deform hat section 16 of clamp 12.

Disposed within cylindrical bore 60 is internal plunger 38. Internal plunger 38 includes a cylindrical main body 68 having at one end thereof an annular disc 70. Internal plunger 38 moves longitudinally within cylindrical bore 60 with cylindrical main body 68 extending through aperture 64 in end wall 62. In the preferred embodiment, the shape of cylindrical bore 60 conforms to the exterior shape of annular disc 70 and the shape of aperture 64 conforms to the external surface of cylindrical main body 68. Biasing spring 40 is also disposed within cylindrical bore 60 and is positioned between annular disc 70 and end wall 62. Spring 40 biases annular disc 70 away from end wall 62 to normally position internal plunger 38 in a lower position as shown in FIG. 2.

Crimp head 10 is activated by exerting a force against the lower end of annular disc 70 of internal plunger 38. For exemplary purposes, this is shown in FIG. 2 by the load L. The application of load L can be accomplished manually using a plunger or other manual methods or the load L can be applied automatically by using a fluid cylinder or other mechanisms to exert the necessary force against annular disc 70.

Clamp 12 shown in FIG. 1 is crimped by crimp head 10 by first placing crimp head 10 in the position shown in FIG. 2 with internal plunger 38 in its downward open position and with jaws 32 and 34 in their open position and disposed on opposite sides of hat section 16. A vertical load L, as shown in FIG. 2, is applied to internal plunger 38. This load is transferred to biasing spring 40. Biasing spring 40 then applies the load to external plunger 36. External plunger 36 is forced upward causing driving cam surface 66 to exert a load on driven cam surfaces 54 and jaws 32 and 34 begin to close which plastically deforms hat section 16 of clamp 12. Biasing spring 40 is calibrated such that it is only partially compressed by the load necessary to move jaws 32 and 34 to their closed position and thus plastically deform hat section 16 as shown in FIG. 4.

Figure 5:
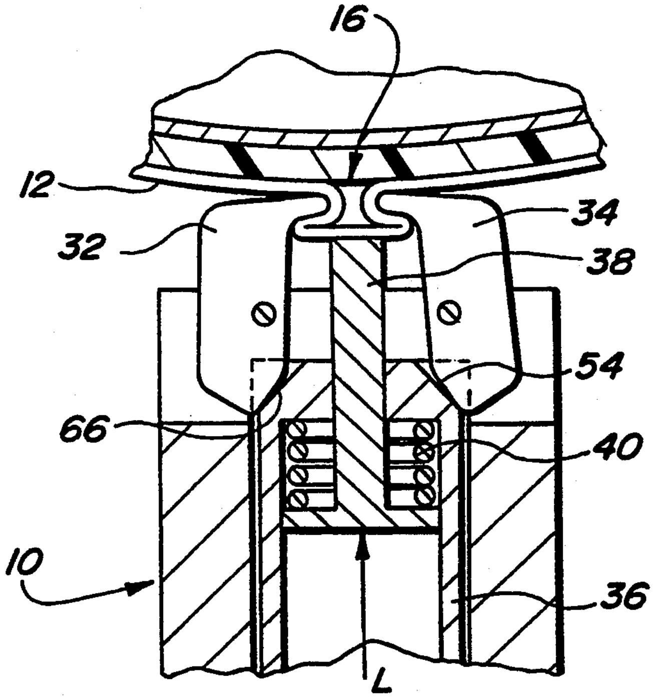
FIG. 5 is a side elevational view partially in cross section of a clamping head according to the present invention positioned with respect to the band clamp shown in FIG. 1 after the omega section has been deformed radially inward to minimize its radial projection.
Figure 6:
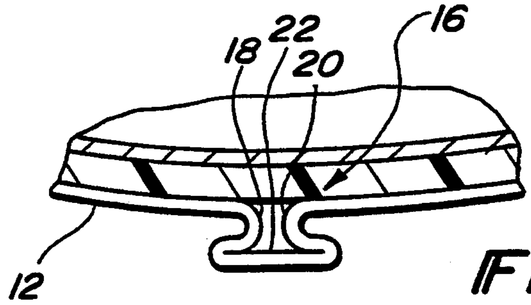
FIG. 6 is a side elevational view of the band clamp shown in FIG. 1 after the crimping head of the present invention has completed its crimping operation.

As additional load is being applied to internal plunger 38, with external plunger 36 having reached its upper position as shown in FIG. 4, internal plunger 38 continues its upward movement to its closed position compressing hat section 16 radially to minimize its radial height as shown in FIG. 5. This completes the crimping of clamp 12. Once the crimping operation is completed, the load is removed from internal plunger 38 to allow movement of internal plunger 38 to its downward open position. This movement allows for the retraction of external plunger 36 to move jaws 32 and 34 to their open position such that crimp head 10 may be removed from clamp 12. If desired, a biasing member may be included which biases jaws 32 and 34 into their open position. An O-ring 90 is shown as the jaw biasing member for exemplary purposes in FIG. 2. Thus when the load is removed from internal plunger 38, driven cam surface 54 will react against driving cam surface 66 to force external plunger 36 into its lower position.

The additional movement by internal plunger 38, after completion of plastically deforming hat section 16 generally tangentially in order to reduce the circumference of clamp 12, minimizes the radial projection of hat section 16 by additional plastic deformation of hat section 16 with this additional deformation being in a radial direction.

While the above detailed description describes the preferred embodiment of the present invention, it should be understood that the present invention is susceptible to modification, variation and alteration without deviating from the scope and fair meaning of the subjoined claims.

What is claimed is:

1. A crimp head for crimping a clamp, said crimp head comprising:

a housing;

at least one jaw member rotatably supported by said housing, said jaw member being movable between an open and a closed position, said jaw member being operable to plastically deform said clamp in a first direction when moved from said open to said closed position;

means for moving said jaw member between said open and said closed position, wherein said means for moving said law member includes an external plunger mounted for longitudinal movement with respect to said housing, said external plunger defining a driving cam surface and said law member defining a driven cam surface, said longitudinal movement of said external plunger moving said jaw member between said open and said closed positions due to the interaction of said driving and driven cam surfaces; and means for plastically deforming said clamp in a second direction generally perpendicular to said first direction, said deforming means plastically deforming said clamp when said deforming means is moved between a first position and a second position after said jaw member is moved to said closed position.

2. The crimp head according to claim 1 wherein said means for plastically deforming said clamp includes an internal plunger mounted for longitudinal movement with respect to said external plunger.

3. The crimp head according to claim 2 further comprising a biasing member disposed between said internal and said external plunger, said biasing member urging said deforming means into said first position.

4. The crimp head according to claim 3 wherein said biasing member is a coil spring.

5. The crimp head according to claim 1 further comprising a biasing member for urging said jaw member into said open position.

6. The crimp head according to claim 1 further comprising a biasing member disposed between said deforming means and said moving means for urging said deforming means into said first position.

7. A crimp head for crimping a clamp, said crimp head comprising:

a housing;

a pair of jaw members rotatably supported by said housing, said jaw members being movable between an open and a closed position, said jaw members being operable to plastically deform said clamp in a first direction when moved from said open to said closed position;

an external plunger mounted for longitudinal movement with respect to said housing, said external plunger being operable to move said jaw members between said open and said closed position;

an internal plunger mounted for longitudinal movement with respect to said external plunger, said internal plunger plastically deforming said clamp in a second direction when said plunger is moved between a first position and a second position after said pair of jaw members are moved to said closed position.

8. The crimp head according to claim 7 wherein said second direction is generally perpendicular to said first direction.

9. The crimp head according to claim 7 wherein said external plunger defines a driving cam surface and each of said jaw members defines a driven cam surface, said longitudinal movement of said external plunger moving said jaw members between said open and said closed positions due to the interaction of said driving and driven cam surfaces.

10. The crimp head according to claim 7 further comprising a biasing member disposed between said internal and said external plungers, said biasing member urging said internal plunger into said first position.

11. The crimp head according to claim 10 wherein said biasing member is a coil spring.

12. The crimp head according to claim 7 further comprising a biasing member for urging said jaw member into said open position.

* * * * *